United States Patent Office 3,145,932
Patented Aug. 25, 1964

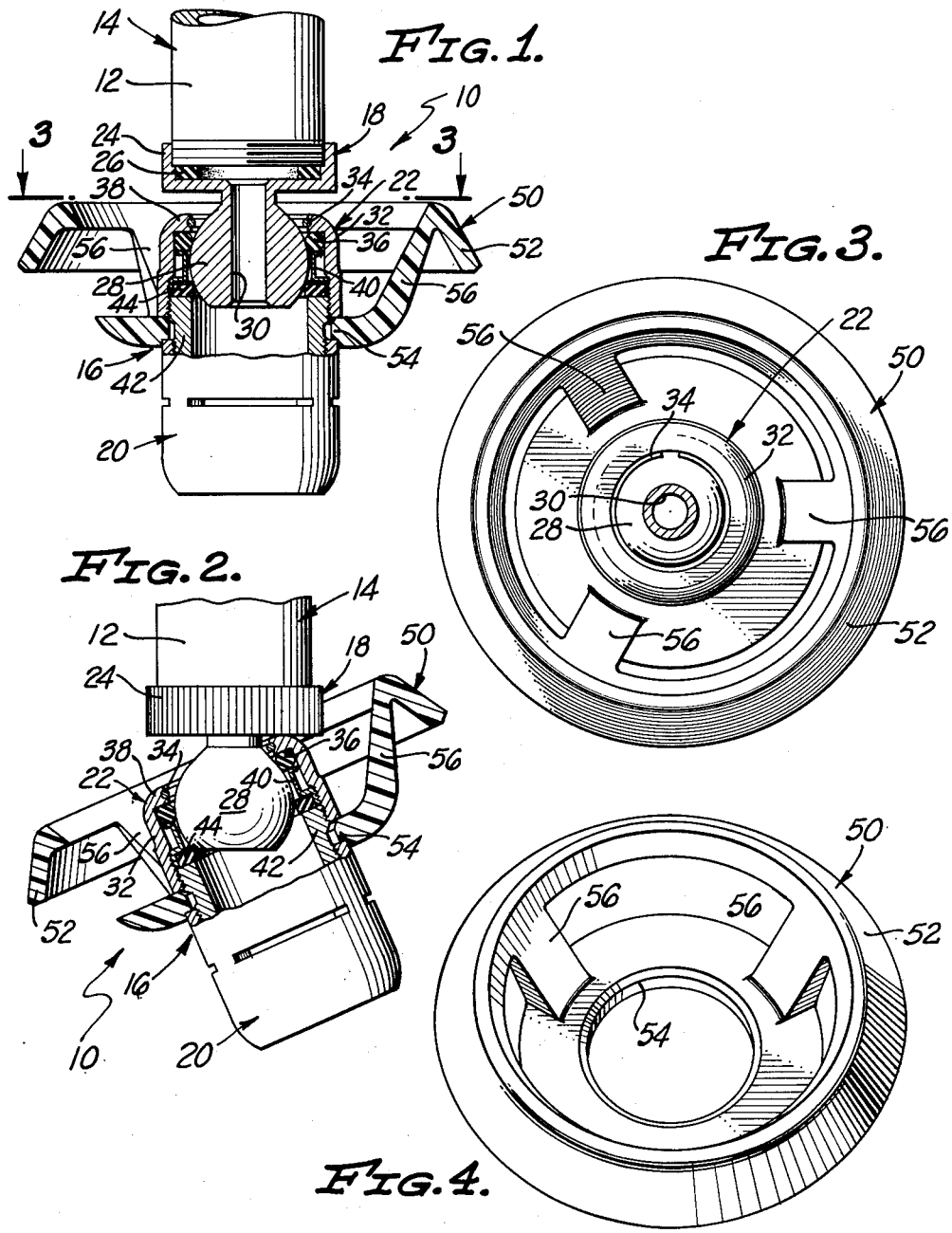

1

3,145,932
SWIVEL AERATOR
Joseph R. Mango, Midlothian, Ill., assignor to Waste King Corporation, Los Angeles, Calif., a corporation of California
Filed Nov. 27, 1962, Ser. No. 240,359
4 Claims. (Cl. 239—587)

The present invention relates in general to a variable-orientation fluid discharge apparatus and, more particularly, to a novel handle arrangement for variably orienting a discharge device of a fluid discharge unit.

Since the invention was originally embodied in and is especially applicable to a handle arrangement for a swivel aerator, and particularly a swivel aerator mounted on the spout of an ordinary kitchen-sink swing-spout mixing faucet, it will be considered in such connection herein for convenience in effecting a disclosure thereof.

In general, the invention contemplates a variable-orientation fluid discharge unit, such as a swivel aerator, which includes: mounting means connectible in fluid communication with a source of fluid under pressure, such as a swing spout; a fluid discharge device, such as an aerating device; and a ball and socket joint interconnecting the discharge device and the mounting means in fluid communication and providing for variably orienting the discharge device relative to the mounting means. When such a variable-orientation fluid discharge unit is utilized in conjunction with a kitchen-sink mixing-faucet swing spout, aerated water may be directed at virtually all portions of the sink by suitably varying the position of the swing spout and/or the orientation of the discharge unit. This is particularly advantageous in flushing food waste into a disposal unit connected to the sink.

A primary object of the invention is to provide a handle means, for varying the orientation of the discharge device relative to the mounting means, which is angular and which encircles and is spaced radially outwardly from the discharge unit. This construction has the advantage of minimizing heat conduction from the discharge unit to the handle means so that the user's fingers are protected even if very hot water is flowing through the discharge unit, which is an important feature of the invention.

Another and important object of the invention is to so connect the annular handle means to the discharge device that the handle means encircles and is spaced radially outwardly from the ball and socket joint and encompasses a zone which includes the center of the ball and socket joint. With this construction, the swing spout may be pivoted from one position to another by pushing laterally on the handle means attached to the fluid discharge device without varying the angular orientation of the discharge device relative to the swing spout, which is another important feature of the invention.

A further object of the invention is to provide connecting means for securing the handle means to the discharge device which comprises simply an element secured to the handle means and clamped between two threadedly interconnected members secured to the discharge device. More particularly, an object in this connection is to mount the annular handle means on an annular flange which is disposed in a zone spaced from and parallel to the zone of the handle means and which is clamped between threadedly interconnected parts of the discharge device and the ball and socket joint, respectively. This construction provides a very simple and inexpensive means of connecting the annular handle means to the discharge device with the handle means encompassing a zone containing the center of the ball and socket joint, which is an important feature.

Still another object is to provide a connecting means for securing the annular handle means to the discharge device which includes circumferentially spaced spokes interconnecting the clamped annnular flange and the annular handle means and inclined relative to the zone of the clamped annular flange and the zone encompassed by the annular handle means. With this construction, the annular handle means is axially offset to include the center of the ball and socket joint in the zone encompassed thereby and, at the same time, the circumferential spacing of the spokes mentioned prevents trapping of water, or other materials, by the handle arrangement of the invention.

The foregoing objects, advantages, features and results of the present invention, together with various other objects, advantages, features and results thereof which will be evident to those skilled in the art to which the invention relates in the light of this disclosure, may be attained with the exemplary embodiment of the invention described in detail hereinafter and illustrated in the accompanying drawing, in which:

FIG. 1 is a view, partially in side elevation and partially in longitudinal section, of a variable-orientation fluid discharge apparatus of the invention;

FIG. 2 is a view similar to FIG. 1, but showing a fluid discharge device of the apparatus of FIG. 1 in a different angular position;

FIG. 3 is a sectional view taken along the arrowed line 3—3 of FIG. 1; and

FIG. 4 is a perspective view of an annular handle means, and mounting means therefor, of the invention.

In the drawing, the variable-orientation fluid discharge apparatus of the invention is designated generally by the numeral 10 and is shown mounted on a source 12 of fluid under pressure in fluid communication therewith. In the environment illustrated, the source 12 is the depending free end of a swing spout 14 of a conventional kitchen-sink mixing faucet, not shown.

The discharge apparatus includes a fluid discharge unit having the form of a swivel aerator 16 mountable on the depending end 12 of the swing spout 14, and including: mounting means 18 connectible to the depending swing-spout end in fluid communication therewith; a fluid discharge device shown as having the form of a conventional water aerating device 20; and a ball and socket joint 22 interconnecting the mounting means and the aerating device in fluid communication and permitting the aerating device to be variably oriented relative to the mounting means 18, and thus to the swing spout 14. It will be understood that by varying the position of the swing spout 14 and/or the angular orientation of the aerating device 20, a stream of aerated water emanating from the aerating device may be directed at virtually any point in a kitchen sink, not shown, with which a mixing faucet, not shown, incorporating the swing spout is used. This is particularly advantageous where the sink discharges into a waste disposal unit since the aerated stream of water emanating from the device 20 may be directed as required to flush food waste out of the sink into the disposal unit.

The swivel aerator 16 per se forms no part of the present invention and any conventional swivel aerator may be used. In the particular construction illustrated, the mounting means 18 has the form of a cap 24 threadable onto the depending swing-spout end 12 and adapted to be sealed relative thereto by an elastomeric washer 26. In the swivel aerator 16 shown, the ball and socket joint 22 includes a ball 28 formed integrally with the cap 24 of the mounting means 18, the cap and the ball being provided with an axial passage 30 therethrough.

The ball and socket joint 22 is also shown as including an annular socket member 32 which encloses the ball 28. The socket member 32 is generally cup shaped and has an open end facing away from the mounting cap 24. The end of the socket member adjacent the mounting cap is provided with an inwardly-extending annular flange 38 forming an axial opening which is rimmed by a spring retaining ring 34 for holding the socket member on the ball. A fluid tight seal between the ball 28 and the socket member 32 is maintained by an O-ring 36 disposed between the inwardly-extending flange 38 and an annular retainer 40 disposed within and suitably secured within the socket member, as by threading it thereinto. Threaded into the open end of the socket member 32 is an annular coupling 42 which serves to retain an elastomeric washer 44 engageable with the ball 28 in the event of axial displacement of the socket member 32 toward the mounting cap 24. It will be noted that the elastomeric washer 44 is confined between the O-ring retainer 40 and the coupling 42.

The aerating device 20 is threaded onto the opposite end of the coupling 42 from the socket member 32. This aerating device may be of any suitable construction, well known in the art, so that a further description is not necessary.

With the foregoing intended primarily as background, the present invention resides principally in providing the swivel aerator 16 with an annular handle means 50, for varying the angular orientation of the aerating device 20 relative to the mounting means 18 and the depending swing-spout end 12, which is connected to the aerating device 20 and which encircles and is spaced radially outwardly from the swivel aerator 16. This radially outward spacing is important since conduction of heat to the annular handle means 50 from hot water flowing through the swivel aerator 16 is minimized. Preferably, the annular handle means 50 comprises a frusto-conical ring 52 which converges toward the mounting means 18.

An important feature of the present invention is that the frusto-conical ring 52 encircles and is spaced radially outwardly from the ball and socket joint 22, and encompasses a zone which includes the center of the ball and socket joint. This relationship between the frusto-conical ring 52 and the center of the ball and socket joint 22 is quite important since it insures that lateral forces applied to the frusto-conical ring for the purpose of pivoting the swing spout 14 laterally will not change the orientation of the aerating device 20 relative to the swing spout, when the aerating device is aligned with the depending swing-spout end 12. On the other hand, however, the angular orientation of the aerating device 20 may be changed readily as desired merely by pressing downwardly on the frusto-conical ring 52 on the side thereof opposite that to which the aerated stream of water is to be directed, or by pulling upwardly thereon with the finger tips on the side thereof toward which the aerated stream is to be directed. Thus, with the construction illustrated, the position of the swing spout 14 and the angular orientation of the aerating device 20 relative to the swing spout may be varied independently of each other with ease, which is an important feature.

The annular handle means 50 is connected to the aerating device 20 by providing the handle means, preferably integrally, with a radially-inwardly-extending annular flange 54 clamped between the open end of the socket member 32 and the adjacent end of the aerating device 20, the coupling 42 between the socket member and the aerating device being of sufficient length to permit such clamping. The annular flange 54 is disposed in a zone parallel to and spaced axially from the zone encompassed by the frusto-conical ring 52, the spacing between these zones being such as to cause the center of the ball and socket joint 22 to lie within the zone of the frusto-conical ring for the reasons hereinbefore discussed. Thus, clamping the annular flange 54 in the manner indicated, coupled with axially offsetting the frusto-conical ring 52 from this annular flange, result in a very simple and economical way of connecting the annular handle means 50 to the aerating device 20 with the annular handle means in the desired position relative to the center of the ball and socket joint 22, which is an important feature.

The frusto-conical ring 52 is mounted on the annular flange 54 by means of circumferentially spaced spokes 56 inclined, preferably at angles less than 90°, relative to the zones of such ring and flange. Such spaced spokes insure against trapping of water, or other materials, by the handle arrangement of the invention.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a variable-orientation fluid discharge apparatus, the combination of:
  (a) mounting means connectible to a source of fluid under pressure in fluid communication therewith;
  (b) a fluid discharge device;
  (c) a ball and socket joint interconnecting said discharge device and said mounting means in fluid communication and providing for variably orienting said discharge device relative to said mounting means;
  (d) annular handle means for varying the orientation of said discharge device relative to said mounting means;
  (e) connecting means securing said handle means to said discharge device with said handle means encircling and spaced radially outwardly from said ball and socket joint and encompassing a zone which includes the center of said ball and socket joint; and
  (f) said connecting means including an element secured to said handle means and clamped between two threadedly interconnected members secured to said discharge device.

2. In a variable-orientation fluid discharge apparatus, the combination of:
  (a) mounting means connectible to a source of fluid under pressure in fluid communication therewith;
  (b) a fluid discharge device;
  (c) a ball and socket joint interconnecting said discharge device and said mounting means in fluid communication and providing for variably orienting said discharge device relative to said mounting means;
  (d) annular handle means for varying the orientation of said discharge device relative to said mounting means;
  (e) connecting means securing said handle means to said discharge device with said handle means encircling and spaced radially outwardly from said ball and socket joint and encompassing a zone which includes the center of said ball and socket joint; and
  (f) said connecting means including an annular flange secured to said handle means and clamped between threadedly interconnected parts of said discharge device and said ball and socket joint, respectively.

3. In a variable-orientation fluid discharge apparatus, the combination of:
  (a) mounting means connectible to a source of fluid under pressure in fluid communication therewith;
  (b) a fluid discharge device;
  (c) a ball and socket joint interconnecting said discharge device and said mounting means in fluid communication and providing for variably orienting said discharge device relative to said mounting means;
  (d) annular handle means for varying the orientation of said discharge device relative to said mounting means;
  (e) connecting means securing said handle means to said discharge device with said handle means encircling and spaced radially outwardly from said ball and socket joint and encompassing a zone which includes the center of said ball and socket joint; and (f) said connecting means including an annular flange secured to said handle means and clamped between threadedly interconnected parts of said discharge device and said ball and socket joint, respectively, in a zone spaced from and parallel to said zone of said handle means.

4. In a variable-orientation fluid discharge apparatus, the combination of:

(a) mounting means connectible to a source of fluid under pressure in fluid communication therewith;

(b) a fluid discharge device;

(c) a ball and socket joint interconnecting said discharge device and said mounting means in fluid communication and providing for variably orienting said discharge device relative to said mounting means;

(d) annular handle means for varying the orientation of said discharge device relative to said mounting means;

(e) connecting means securing said handle means to said discharge device with said handle means encircling and spaced radially outwardly from said ball and socket joint and encompassing a zone which includes the center of said ball and socket joint;

(f) said connecting means including an annular flange secured to said handle means and clamped between threadedly interconnected parts of said discharge device and said ball and socket joint, respectively, in a zone spaced from and parallel to said zone of said handle means; and (g) said connecting means including circumferentially spaced spokes inclined relative to said zones and interconnecting said handle means and said annular flange.

References Cited in the file of this patent

UNITED STATES PATENTS

| | | |
|---|---|---|
| 167,505 | Crawford | Sept. 7, 1875 |
| 1,032,589 | Cooke | July 16, 1912 |
| 2,285,768 | Drucker | June 9, 1942 |
| 2,692,102 | Cobham | Oct. 19, 1954 |
| 2,971,701 | Shames et al. | Feb. 14, 1961 |
| 2,990,122 | Blumberg et al. | June 27, 1961 |
| 3,003,312 | Jewell | Oct. 10, 1961 |